July 3, 1934.  H. H. BLASE  1,965,277
EYEGLASSES OR SPECTACLES
Filed April 8, 1933
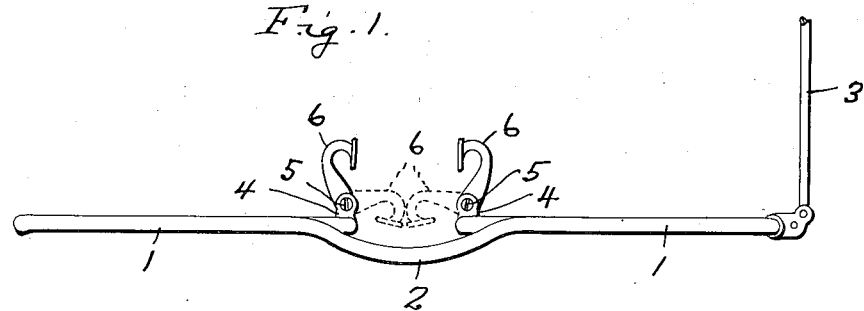
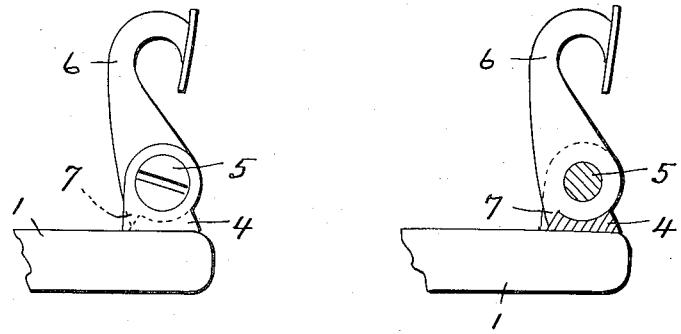
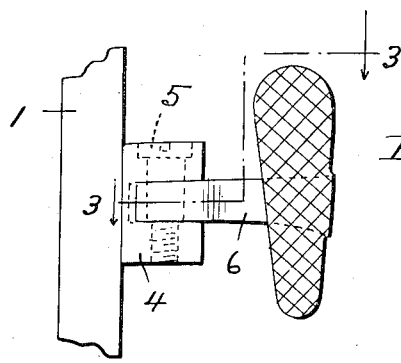
Inventor
Harry H. Blase
By Clarence A. O'Brien
Attorney Patented July 3, 1934

1,965,277

UNITED STATES PATENT OFFICE 1,965,277

EYE GLASSES OR SPECTACLES

Harry H. Blase, Wilkes-Barre, Pa.

Application April 8, 1933, Serial No. 665,227

2 Claims. (Cl. 88—49)

The present invention relates to new and useful improvements in eye glasses of the rim or rimless type or spectacles and has for one of its important objects to provide, in a manner as hereinafter set forth, eye glasses or spectacles comprising nose rests embodying a construction which is such that said nose rests may be expeditiously removed and replaced should it be desired to do so for any reason.

Another very important object of the invention is to provide eye glasses or spectacles equipped with nose rests which may be swung or folded to such a position when not in use as to require a minimum of space in addition to materially reducing the chance of breakage.

Still another object is to provide a construction and arrangement which is such that the invention may be attached at any suitable point to either a frame or rimless mounting.

Other objects of the invention are to provide eye glasses or spectacles embodying nose rests of the aforementioned character which will be simple in construction, strong, durable, efficient and reliable in use, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a top plan view, showing a pair of eye glasses or spectacles equipped with nose rests in accordance with the present invention.

Figure 2 is a detail view in top plan and on an enlarged scale of one of the nose rests.

Figure 3 is a view in horizontal section, taken substantially on the line 3—3 of Figure 4.

Figure 4 is an elevational view of one of the nose rests.

Referring now to the drawing in detail, it will be seen that the reference numeral 1 designates the lens frames which are connected together in spaced relation to each other in the usual manner by a bridge 2. The reference numeral 3 designates a temple mounted on one of the lens frames 1.

The embodiment of the present invention which has been illustrated comprises bifurcated eyes 4 which are secured in any suitable manner, as by soldering, to the inner portions of the lens frames 1, as best seen in Figures 2 and 3 of the drawing.

Headed pivot screws 5 are removably mounted in the bifurcated eyes 4, the upper bifurcations of said eyes being counterbored for the reception of the heads of said screws 5, the lower bifurcations of said eyes 4 being threaded for threaded engagement by the screws 5.

Journaled for swinging movement on the screws 5 are nose rests 6. The nose rests 6 include stops 7 for abutting engagement with the connecting or bight portions of the bifurcated eyes 4 in a manner to limit the swinging movement of said nose rests toward operative position.

It will thus be seen that nose rests for eyeglasses or spectacles have been provided which will function in the usual manner when in use and which may be conveniently swung to such a position when not in use as to materially reduce the chance of breakage as well as requiring considerably less space, as indicated in broken lines in Figure 1 of the drawing. Further, should the nose rests become broken or damaged or should it be desired to remove or replace the same for any other reason, this may be easily accomplished by simply removing the pivot screws or pins 5, as will be apparent.

It is believed that the many advantages of eye glasses or spectacles constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. In eyeglass construction, in combination, lens supporting members, a bridge connecting said members together in spaced relation, a stud connected to the nasal side of each member below the horizontal plane of the bridge and each stud extending inwardly beyond the inner face of said member, horizontally arranged shanks each having one end pivoted to a stud for movement about a vertical axis, whereby said shanks can be moved from a position where they extend at substantially right angles to the members to a position in the space between said studs, the other or free ends of said shanks being of hook shape with the hook parts extending toward each other, and a substantially vertically arranged nose pad forming plate connected intermediate its ends to the beak of each hook part.

2. In eyeglass construction, in combination, lens supporting members, a bridge connecting said members together in spaced relation, a stud connected to the nasal side of each member below the horizontal plane of the bridge and each stud extending inwardly beyond the inner face of said member, horizontally arranged shanks each having one end pivoted to a stud for movement about a vertical axis, whereby said shanks can be moved from a position where they extend at substantially right angles to the members to a position in the space between said studs, the other or free ends of said shanks being of hook shape with the hook parts extending toward each other, a substantially vertically arranged nose pad forming plate connected intermediate its ends to the beak of each hook part, each stud being bifurcated to provide upper and lower prongs between which said one end of each shank is located, one prong having a threaded hole therein and the other prong having a countersunk opening passing therethrough, a screw forming the pivot for each shank, said screw passing through the countersunk opening of one prong with its threaded part threaded in the hole of the other prong and its head resting in the countersink, and stop means for each shank for limiting outward movement of the shank.

HARRY H. BLASE.